United States Patent [19]

Suehisa et al.

[11] Patent Number: 4,657,400

[45] Date of Patent: * Apr. 14, 1987

[54] MIXING DEVICE

[75] Inventors: Shiro Suehisa, Osaka; Hideki Kajiwara, Kyoto, both of Japan

[73] Assignee: Joto Chemical Co. Ltd, Osaka, Japan

[*] Notice: The portion of the term of this patent subsequent to Oct. 8, 2002 has been disclaimed.

[21] Appl. No.: 746,736

[22] Filed: Jun. 20, 1985

[51] Int. Cl.$^4$ ............................................. B01F 15/06
[52] U.S. Cl. ................................. 366/144; 366/69; 366/176; 366/184; 366/293
[58] Field of Search ................. 366/69, 71, 72, 96–98, 366/99, 293, 294, 184, 315–317, 144–147, 176, 149; 51/407

[56] References Cited

U.S. PATENT DOCUMENTS 4,545,685 10/1985 Suehisa et al. ................. 366/69 X Primary Examiner—Timothy F. Simone
Attorney, Agent, or Firm—Stephen F. K. Yee

[57] ABSTRACT

A device for mixing, milling or kneading feed materials, such as plastics and fillers, including a pair of spaced apart upper and lower discs defining therebetween a mixing zone. Each disc has an operating surface and is adapted so that by rotation of one of the discs, a relative motion between the two operating surfaces may be maintained. A collecting ring with a groove extending along the inner surface thereof is provided around the periphery of the mixing zone to define an annular passage which is in fluid communication with the mixing zone and which is open at one end and closed at the other end. By rotation of one of the discs, the mixed product is collected in the passage, displaced therethrough and discharged from the open end portion or scraped off at the closed portion for recovery.

8 Claims, 22 Drawing Figures

MIXING DEVICE

CROSS REFERENCE TO RELATED APPLICATION

The present application is related to the Applicants' copending application Ser. No. 618,742, filed on June 8, 1984, and now U.S. Pat. No. 4,545,685, the disclosure of which is incorporated herein by reference.

BACKGROUND OF THE INVENTION

1. Field of the Invention

This invention relates generally to a mixing device. More specifically, the present invention is concerned with a disc-type mixing device useful for mixing, milling or kneading solids such as plastic materials.

2. Related Art

There are known methods in which waste plastic materials are mixed with powdery fillers such as sludge and wood powder for the production of construction materials. The step of mixing or kneading the plastic materials and fillers is generally effected by means of a Bambury's mixer or a biaxial extruder. Such known devices, however, suffer from a drawback that homogeneous dispersion cannot be accomplished even if the mixing step is conducted for a long period of time. In addition, with a mixing device of an extruder type, it is impossible to increase the ratio of the amount of the filler to the amount of the plastic material because of a danger of blockage or clogging by the filler within the cylinder of the extruder.

SUMMARY OF THE INVENTION

In accordance with the present invention there is provided a mixing device which comprises a pair of plate means coaxially aligned and spaced apart from each other to define therebetween a mixing zone, each plate means having an operating surface facing the other operating surface and being adapted so that, by rotation of one of the plate means, a relative motion between the two operating surfaces may be maintained; grooves provided in both of the operating surfaces and arranged so that the grooves of one operating surface may cross the grooves of the other operating surface upon the relative motion between the two operating surfaces; and a collecting ring having a groove which extends along the inner surface thereof and provided around the periphery of the mixing zone to define an annular passage between the collecting ring and the plate means. The passage opens at one end downstream of the direction of the rotation of the plate means and closes at the other, upstream end, so that the mixed product in the mixing zone is collected within the passage, displaced therethrough in the direction of the rotation of the plate means upon rotation of the plate means and discharged from the downstream end of the passage.

By the crossing of the grooves of both operating surfaces (when viewed in a plane projection) upon the relative motion, generally rotation, the solids between the two operating surfaces may be subjected to shear forces so that the mixing efficiency and kneading efficiency are improved. When the grooves of both operating surfaces are arranged so that each crossing point in a plane projection displaces outwardly toward the periphery of the plate means, the mixed product between the two operating surfaces is urged to be discharged therefrom in an accelerated manner.

The advantages accruing from the mixing device of the present invention are as follows:

1. Mixing efficiency is extremely higher than the conventional mixers. With the mixing device according to the present invention, a mixing time of 5-30 seconds is sufficient to attain homogeneous mixing. Therefore, it is possible to mix such raw materials that are thermally unstable, such as polyvinyl chlorides, chlorinated polyethylenes or wood powder.

2. Since the mixing device has a high mixing performance and is adapted for mixing at an elevated temperature, the volume ratio of the plastic material to the filler can be decreased to a value which is proximate to the limit value 26/74.

3. The mixing device is utilizable for decreasing the volume of bulky materials formed of foamed materials, thin films or the like.

4. High mixing performance makes it possible to minimize the area of the operating surfaces. Thus, the mixing device becomes compact and requires less energy consumption.

5. The mixed product can be collected easily and efficiently irrespective of whether it is highly fluid or highly viscous. The mixing device is suited for mixing plastics whose viscosity is widely variable with the temperature. Thus, the apparatus of this invention is applicable for mixing or kneading a wide variety of feedstocks, especially plastic materials with a broad range of melt index, without encountering a problem in recovery of mixed products.

BRIEF DESCRIPTION OF THE DRAWINGS

The invention will now be described further with reference to the accompanying drawings, in which.

DESCRIPTION OF THE PREFERRED EMBODIMENTS

Figure 1:
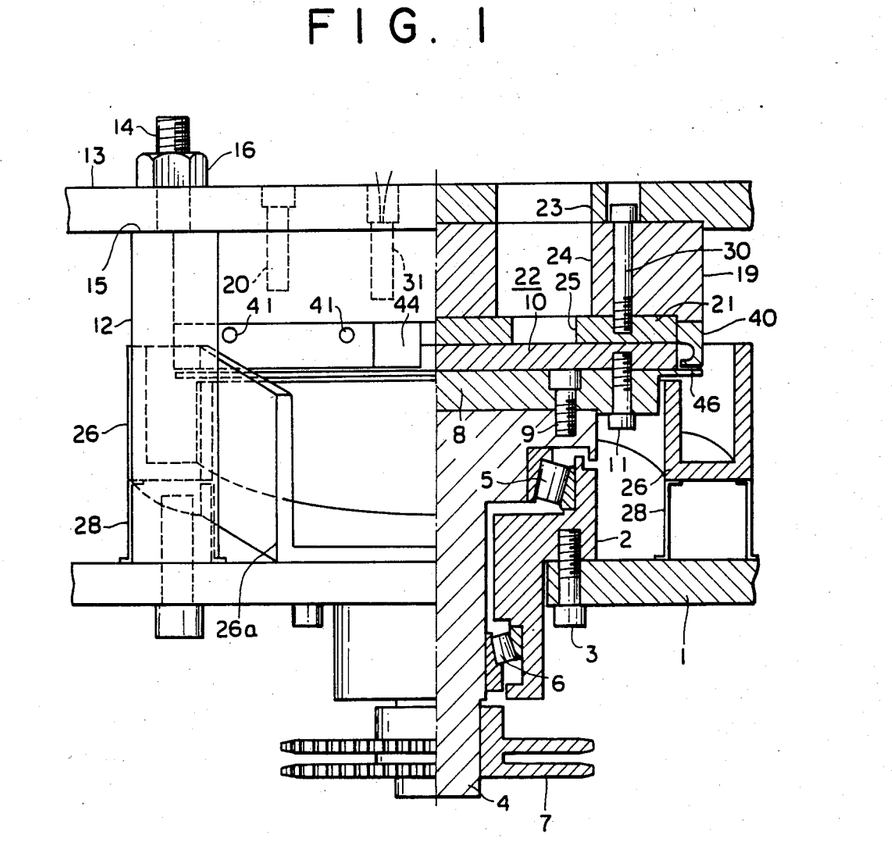
FIG. 1 is an elevational view, partly in cross-section, diagrammatically showing one embodiment of the mixing device according to the present invention.
Figure 2:
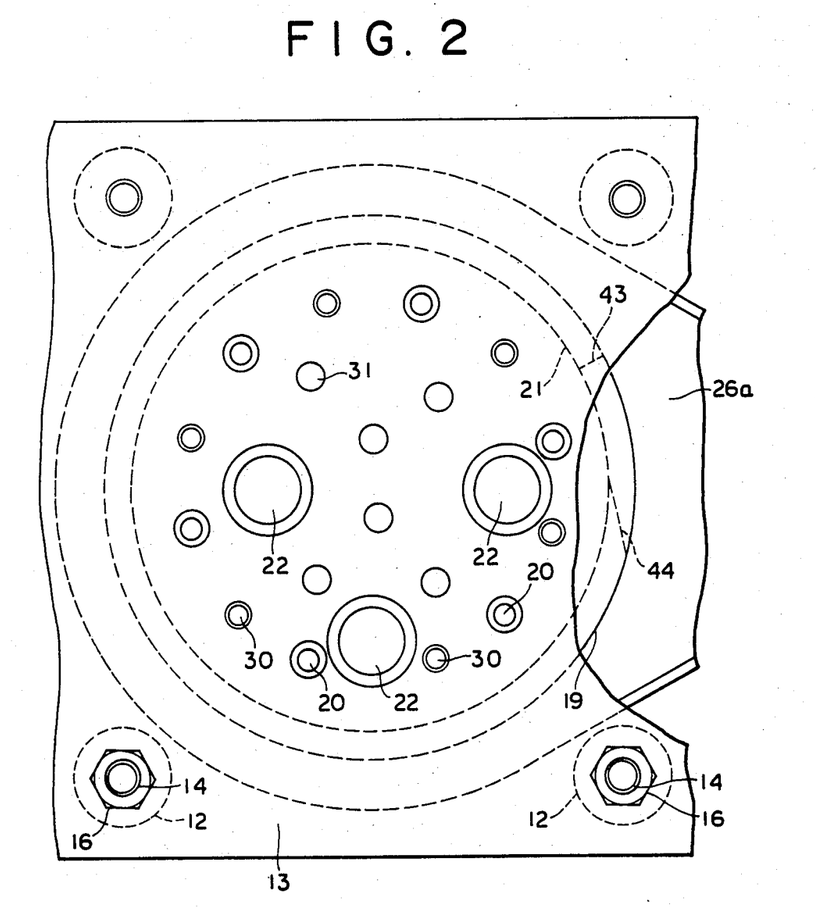
FIG. 2 is a plan view of FIG. 1, cut away in part.

Referring first to FIGS. 1 and 2, the reference numeral 1 denotes a lower support frame having a central aperture through which a sleeve member 2 is inserted. The sleeve member 2 is fixed to the lower frame 1 by means of screws 3. An axle 4 is rotatably received by the sleeve member 2 with its axis as the center of rotation. Designated as 5 and 6 are bearings. The axle 4 has its lower end portion fixedly provided with a sprocket 7 which is driven by a chain (not shown) for rotation with the axle 4. The axle 4 has a flange portion at its top to which is fixedly secured a lower supporting plate 8 by means of screws 9. To the supporting plate 8 is fixed a lower operating disc 10 by means of screws 11. Thus, the lower operating disc 10 rotates about the axis of the axle 4 upon actuation of the sprocket and chain drive.

A plurality (four in the specific embodiment shown) of support bars 12 are vertically provided on the lower support frame 1, to the upper portions of which is horizontally secured an upper support frame 13. Thus, each support bar 12 has an upper, smaller diameter portion 14 provided with external threads. The upper frame 13 is in supporting engagement with the upper surface 15 of the stepped portion of each support bar and is secured thereto by nuts 16.

Firmly fixed to the upper frame 13 by means of screws 20 is an upper supporting plate 19 to which is fixedly secured an upper operating disc 21 by means of screws 30. The upper and lower operating discs 21 and 10 are disposed face to face with a predetermined space therebetween. The distance between the discs 21 and 10, which can be varied by providing a spacer (not shown) between the stepped portion 15 of each of the vertical support bars 12 and the upper frame 13, is maintained at a predetermined value throughout the mixing operation. The space between the two opposing discs 10 and 21 serves as a mixing zone where mixing of feed materials is effected.

The upper frame 13, the upper supporting plate 19 and the upper disc 21 having openings 23, 24 and 25, respectively, by which a feed port 22 for feeding the feed stock to be mixed is defined. Thus, the feed port 22 is in fluid communication with the mixing zone. Two or more feed ports with the above construction may be provided, if desired. The feed port 22 can serve also as an exhaust port from which gases trapped with the feed stock and steam generated during the mixing operation may be advantageously withdrawn. If necessary, an air cylinder, screw conveyor or any other means can be disposed in each feed port 22 for acceleration of the feed of the feed stock to the mixing zone. The feed stock introduced into the mixing zone is subjected to mixing operation effected by rotation of the lower disc 10 and the mixed product is discharged from the outer periphery of the two discs 10 and 21.

A generally C-shaped collecting ring 40 is provided around the periphery of the mixing zone to receive the mixed product discharged from the mixing zone. Details of the collecting ring 40 are shown in FIGS. 3(a) through 3(c) and FIG. 4(a). The collecting ring 40 is firmly secured to the stationary, upper disc 21 by means of screws 41 and has a groove 42 extending along the inner surface thereof. The groove 42 in the embodiment shown in FIG. 4(a) has a cross-sectional area gradually reduced from an open end 43 toward a closed end 44. The cross-section of the groove may have any desired shape so long as the movement of the mixed produce therethrough is not adversely affected.

Figure 4A:
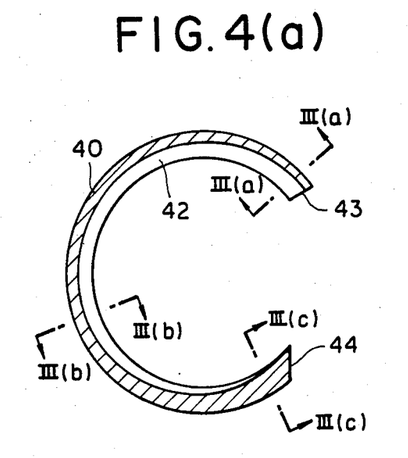
FIG. 4(a) is a horizontal cross-section of the collecting ring, taken on line IV—IV in FIGS. 3(a)-3(c)
Figure 4B:
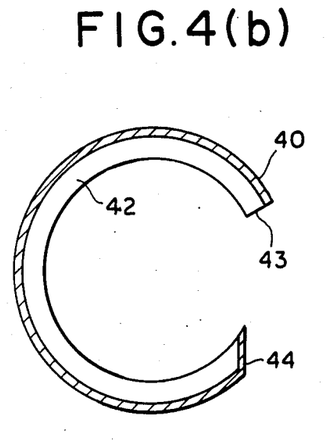
FIG. 4(b) is a horizontal cross-section, similar to FIG. 4(a), showing an alternate embodiment of the collecting ring.

As a result of the above construction, there is defined between the collecting ring 40 and the discs 10 and 21 an annular, generally C-shaped passage 45 which is in fluid communication with the mixing zone and which opens at the end 43 but closes at the other end 44. Thus, the mixed product from the mixing zone is received in the passage 45, passed through the passage 45 by rotation of the lower disc 10 in the same direction as the rotation of the disc 10 (clockwise as seen in FIG. 4(a)) and discharged from the open ended portion 43. The movement of the mixed product through the passage 45 is accelerated because the passage is gradually broadened from the upstream end (closed end 44) toward the downstream end (open end 43). Although the sectional area of the passage 45 in the illustrated embodiment is continuously increased from the upstream end toward the downstream end, similar effect may be obtained with a stepwisely broadened passage. Such a gradually broadened structure is not essential to displace the mixed product through the passage 45 but is preferred for reason of smooth displacement of the mixed product therethrough. As shown in FIG. 4(b), the passage can have the same sectional area throughout its length.

The mixed product displaced through the passage 45 is thus successively discharged from the open ended portion 43. A part or all of the discharged product falls on a discharge port 26a for recovery, with the remainder portion sticking to the peripheral surfaces of the discs 10 and 21. This portion is scraped by the closed end portion 44 of the passage 45 which is shaped and arranged to serve as a scraping blade.

Provided beneath the periphery of the discs 10 and 21 is an annular recovery vessel 26 having a U-shaped cross-section and being disposed in position by means of a support 28 mounted on the lower frame 1. The discharge port 26a is provided in the vessel 26 at a position adjacent to the end portions 43 and 44 of the C-shaped collecting ring 40 for recovering the mixed product both discharged from the opening 43 and scraped off by the closed portion 44. To facilitate the discharge of the mixed product from the annular vessel 26, the bottom of the vessel 26 at the discharge port 26a may be slanted downwardly in the radial outward direction.

Figure 3A:
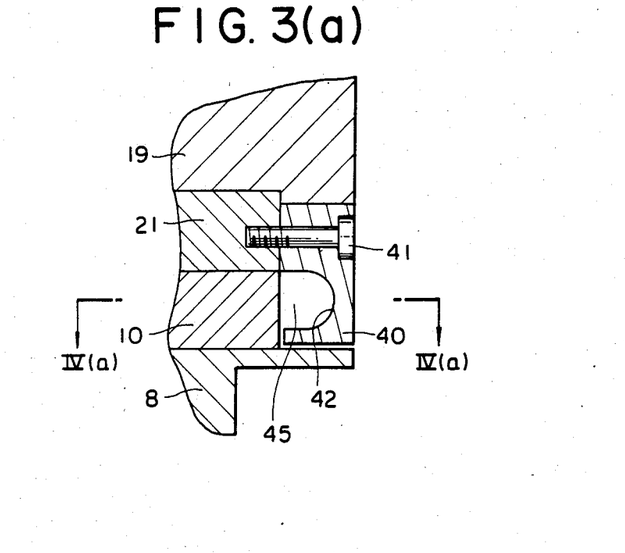
FIGS. 3(a), 3(b) and 3(c) are fragmentary, vertical cross-sectional views, taken along lines III(a)—III(a), III(b)—III(b) and III(c)—III(c), respectively, in FIG. 4(a) and diagrammatically showing the product collecting ring of FIGS. 1 and 2.
Figure 3B:
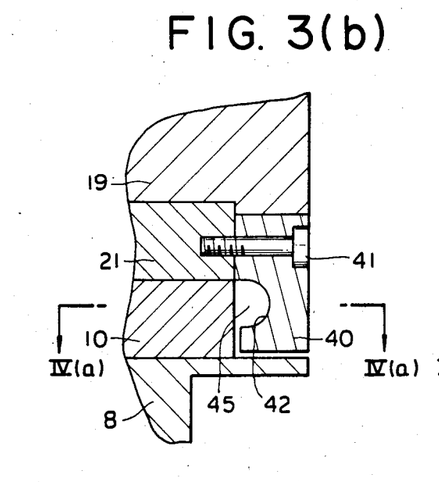
Figure 3C:
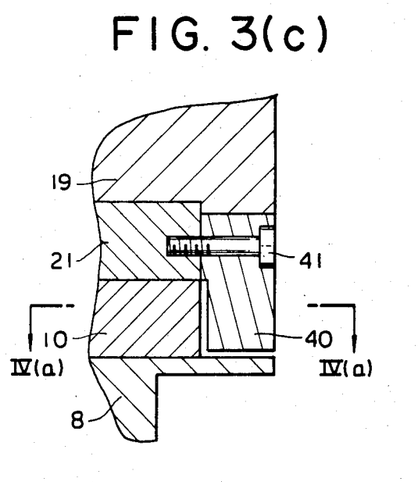

As shown in FIGS. 3(a) through 3(c), the collecting ring 40 is preferably positioned so that the collecting ring 40 is spaced apart from both the rotatable, lower disc 10 and the lower supporting plate 8 with a small distance to prevent the direct contact between them, preferably in the range of 0.1 to 5 mm. Too large a space causes discharge of the mixed product through the gap. While the mixed product leaked through the gap may be collected in the vessel 26, such a leakage is desired to be as low as possible.

Means for vibrating the collecting vessel 26 may be suitably provided for facilitating the recovery of the mixed product discharged through the gap to the vessel 26. In this case, it is also preferred that the collecting vessel 26 be maintained in a slanted position, preferably at an angle of 3°-20° from the horizontal plane, such that the discharge port 26a is located at the lowermost level, and that the collecting vessel 26 be resiliently supported on the lower frame 1. As shown in FIG. 1, the lower supporting plate 8 preferably has an annular flange portion 46 extending radially outwardly beyond the circumference of the lower disc 10 to prevent the deposition of the mixed product leaked through the gap on the periphery of the lower supporting plate 8. The discharge port 26a can be connected to a feed port of an injection molding machine, an extruder or the like.

If desired, a cooling means such as a water jacket may be provided in the collecting vessel 26 to prevent the deposition of the molten mixed product on the surfaces of respective parts. Designated as 31 in FIG. 1 is a heater for indirectly heating the raw materials in the feed port 22 and in the mixing zone defined between the two operating discs 10 and 21. A heater in the form of a band may be provided around the periphery of the upper supporting plate 19 to achieve the similar purpose.

Figure 5A:
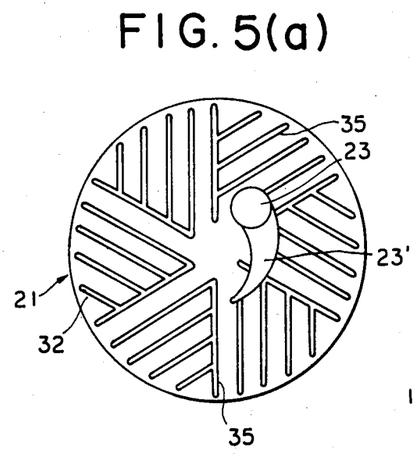
FIGS. 5(a) and 5(b) are plan views diagrammatically showing the operating surfaces of the upper and lower discs, respectively.
Figure 5B:
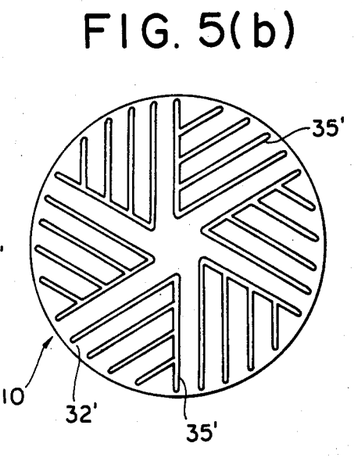

FIGS. 5(a) and 5(b) illustrate the operating surfaces of the upper and lower discs 21 and 10, respectively. The upper disc 21 has a multiplicity of grooves 35 on its operating surface. In the particular embodiment shown, the surface of the disc 21 is angularly equally divided by six grooves radially outwardly extending from the center of the disc 21 into six segments or sectors. Each segment has a plurality of grooves arranged in parallel with the radial groove. The grooves are formed such that the grooves in one segment are not parallel with the grooves in adjacent segments. The lower disc 10 is provided with similar grooves 35' as shown in FIG. 5(b). The segments from which each disc is constituted may be constructed in such a way as to be disassembled from each other. Such a construction is economically advantageous because when the disc is broken, it suffices that the broken segment or segments alone be replaced with new segment or segments. As shown in FIGS. 5(a) and 5(b), all the grooves 35 and 35' are terminated before the peripheral edge, thereby forming a flat, annular portion 32 and 32' at the periphery. The flat portion serves as a dam to retard the flow of the mixed product.

The upper and lower disc 21 and 10 thus constructed are mounted on the upper and lower supporting plate 19 and 8 (FIG. 1), respectively, with their operating surfaces covered with the grooves being faced and, generally, in parallel with each other and with a predetermined separation of, preferably, 0.2–2 mm. In FIG. 5(a), the reference numeral 23' is an arched, concave portion formed on the operating surface of the disc 21. The concave portion 23' is in fluid communication with the feed port 22 and becomes gradually shallow and thin to facilitate the flow of the feed materials from the feed port 22 to the mixing zone defined between the two operating surfaces.

The feed materials are mixed in the mixing zone. Upon rotation of the axle 4, a relative motion is maintained between the two operating surfaces. Since the grooves of the upper disc 21 cut the grooves of the lower disc 10, when viewed in the plane projection, the feed materials fed between the two operating surfaces are mixed and kneaded with each other in a facilitated manner because of the shear forces exerted thereon. Whilst it is convenient to maintain the upper disc 21 stationary and rotate the lower disc 10, the opposite arrangement may be used if desired. The relative motion between the two operating surfaces can be of course maintained by rotation of the two discs 21 and 10.

Alternative embodiments of the groove arrangement are shown in FIGS. 6(a)–6(f). The pattern or profile of the grooves as shown in FIGS. 5(a) and 5(b) is generally preferred because of good mixing performance, however. In FIGS. 6(a)–6(f), only the upper disc is shown and the illustration of the concave portion 23' and opening 23 is omitted. Similar component parts are designated by the same reference numerals in the drawings.

Figure 6A:
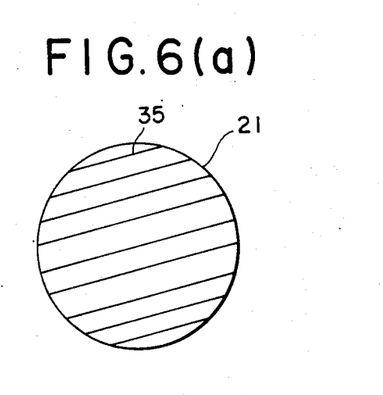
FIGS. 6(a) through 6(f) are plan views schematically illustrating alternate embodiments of operating surfaces.
Figure 6B:
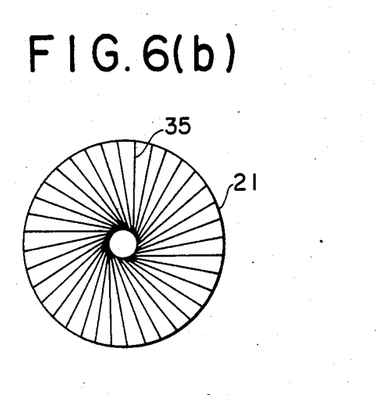
Figures 6C, 6D:
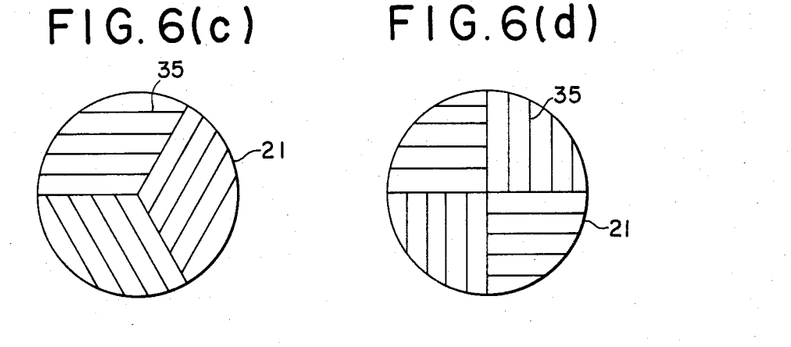
Figure 6E:
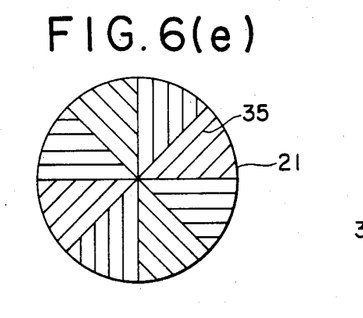
Figure 6F:
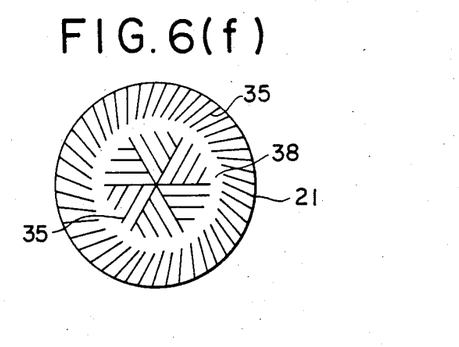
Figure 7A:
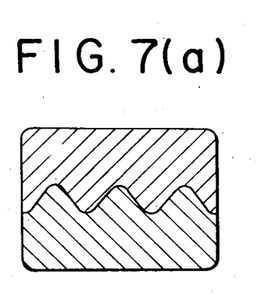
FIGS. 7(a) through 7(g) are vertical cross-sections schematically illustrating alternate embodiments of the upper and lower discs.
Figure 7B:
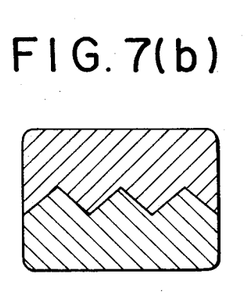
Figure 7C:
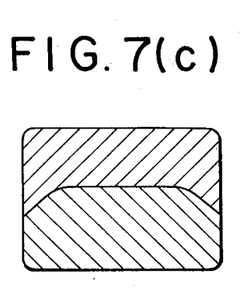
Figure 7D:
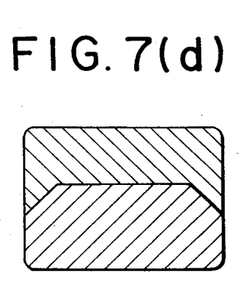
Figure 7E:
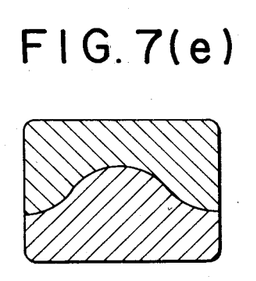
Figure 7F:
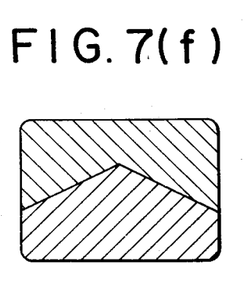
Figure 7G:
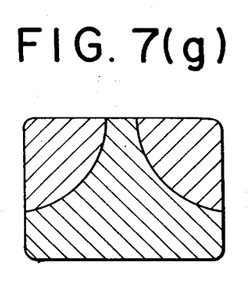

The grooves 35 of the disc 21 of FIG. 6(a) are arranged uni-directionally. In FIG. 6(b), the grooves are arranged approximately radially. This arrangement is suited for rapid flow of the feed materials. The patterns of FIGS. 6(c)–6(e) are variants of FIG. 5(a) and are the same as the pattern of FIG. 5(a) except that the patterns of FIGS. 6(c) through 6(e) have three, four and eight segments, respectively. The pattern shown in FIG. 6(f) is a combination of the patterns of FIG. 5(a) and FIG. 6(b). The disc 21 of FIG. 6(f) has its central portion provided with such grooves as shown in FIG. 5(a), a flat annular portion 38, and an annular peripheral portion provided with the grooves as shown in FIG. 6(b). The flat portion 38 serves as a stop or a dam to retard the flow of raw materials to be mixed through the mixing zone. As a result, a plastic material which has a high melting point and is difficult to knead can be effectively kneaded. The mixing is effected mainly in the central region of the operating surface inside of the dam 38, while the main function of the outer peripheral region outside of the flat portion 38 is to accelerate the discharge of the mixed product. That is, the retardation of the flow resulting from the dam portion 38 may be compensated by the radial orientation of the grooves at the periphery portion. The flat portion 38 is preferably provided on both or either of the upper and lower discs 21 and 10. It is preferred that both discs 21 and 10 have such flow stops 38 in such positions that they face with each other when mounted at positions.

The operation surfaces of FIGS. 6(a) through 6(c) can be provided with a flat portion or dam in the same manner as shown in FIG. 5(b). The patterns of the grooves 35 are not limited to the above embodiments and can be any patterns, such as circinate patterns, so long as the grooves of the upper disc 21 can cut the grooves of the lower disc 10 during their relative rotation.

Although it is preferred that, as shown in the above embodiments, the upper and lower plate members 21 and 10 have a circular shape of the same diameter, they can be formed into discs of different diameters, if desired. The thickness of the upper and lower plate members 21 and 10 is not specifically limited.

The cross section of the grooves of the operating plates 10 and 21 can be V-shaped, curved (e.g. semicircular), trapezoidal (e.g. wedge-shaped) or any suitable combination thereof. The depth and the width of the groove and the distance between two adjacent grooves may vary according to the kind and thickness of the raw material to be mixed. Preferably, the depth is between 0.5 and 5 mm, the width is between 1 and 10 mm and the distance between two adjacent grooves is between 0.1 and 10 times, more preferably between 0.5 and 4 times, the width of the groove. The operating surfaces of the discs 21 and 10 are suitably formed of iron or steel. If necessary, the operating surfaces may be covered with a non-abrasive material such as ceramic or a wear resistant alloy.

The operating surfaces of the discs 21 and 10 are generally disposed in parallel with each other. However, if desired, the distance between the two operating surfaces at a peripheral portion can be made smaller than that at central portion.

In all the above combinations, the operation surfaces of the discs 10 and 21 are substantially flat when the roughness resulting from the grooves is not taken into consideration. However, both discs 10 and 21 can have wavy, curved or creased surfaces which are in engagement with each other in such a way as to permit the relative motion (rotation) therebetween, as illustrated in FIGS. 7(a)–7(g). In such a non-flat structure, the surface area of each disc becomes greater than that of the flat disc of the same diameter, whereby an improvement in mixing efficiency may result. Further, the flow rate of the feed materials through the mixing zone can be controlled by the shape of the non-flat surface. In FIGS. 7(a)–7(g), the illustration of the grooves is omitted.

The mixing device according to the present invention is suitably used for the kneading of a waste plastic material and an organic or inorganic filler and for kneading flour pastes for the preparation of noodles or fish pastes for the preparation of "Kamaboko" or "Chikuwa". The plastic material may be a thermoplastic resin such as a polyethylene, a polypropylene, a polyvinyl chloride, a polystyrene, a polyester, an acrylonitrile-butadiene-styrene resin or a polyamide, or a thermosetting resin such as an epoxy resin, a polyester, a urea resin, a phenol resin or a silicone resin. The plastic material is fed to the feed port of the mixing device in the form of powder or granules having a diameter of between about 0.1 and 10 mm. By constructing the mixing device as a large device with a feed means being provided in its large feed port, it is possible to treat a gross plastic material such as a foamed material, a container, a film or a sheet. An example of the organic filler is wood powder. Examples of inorganic fillers include a sludge (ash from heavy petroleum oil), a slug, stone powder, talc, silica, carbon black, finely divided glass, etc. The above organic and inorganic fillers may be used in combination of two or more. If necessary, a coloring agent, a stabilizer or the like additives may be incorporated into the feed materials.

The feed materials may be fed to the feed port 22 after being premixed with each other. However, it is convenient that they are introduced separately into the mixing device from separate feed ports. In this case, it is preferred that the plastic material be fed from the feed port located near the center of the rotation and the filler be introduced from the feed port located more remote from the center for reason of easy attainment of homogenous mixing between them. The feed materials are then kneaded in the mixing zone while being heated by the heater 31. The feed materials are heated to a temperature higher by 10°–150° C. than the melting point of the plastic material by the heat from the heater and the heat generated by friction. The kneaded or mixed product is discharged from the discharge port 26a and is passed to a succeeding treatment zone such as an extruder while being maintained in the molted state. If the mixing device is used for mixing of solids or for grinding of solids, it is not necessary to use the heater 31.

The following examples will further illustrate the present invention.

Example 1

Polypropylene pellets having a grain size of about 5 mm and an MI as shown in Table 1 were kneaded with the device as shown in FIG. 1 whose operating discs 21 and 10 had a diameter of 450 mm, a thickness of 25 mm, a pattern of the grooves 35 and 35' as shown in FIG. 5(b). Each groove is semicircular in cross-section with a radius of 3 mm. The device had an output power of 11.0 KW. The rotational speed of the disc 10 was 23 r.p.m. The device has a collecting ring 40 with a 45 mm×25 mm cross-section and a groove 42 as shown in FIG. 4(a) whose maximum radius is 10 mm. The heating temperature by a heater 31 was 240° C. The mixed product was recovered at a rate of 30 Kg per hour. The load of the motor for the rotation of the disc 10, the temperature of the kneaded product, the recovery rate and the recovery conditions are summarized in Table 1.

For the purpose of comparison, the above procedure was repeated using the same mixing device as used above except that the C-shaped collecting ring was removed and substituted with a blade as disclosed in our copending U.S. Ser. No. 618,742, the disclosure of which is hereby incorporated by reference. The results are also summarized in Table 1 as Test Nos. 4–6.

TABLE 1

| Test No. | MI of polypropylene | Temperature of mixed product (°C.) | Load of motor (A) | Recovery rate (%) | Conditions |
| --- | --- | --- | --- | --- | --- |
| 1 | 0.7 | 195 | 18 | 100 | Mainly scraped by the end portion 44 |
| 2 | 10 | 185 | 21–22 | 100 | Mainly fell from the open end 43 |
| 3 | 25 | 180 | 15–16 | 100 | Mainly fell from the open end 43 |
| 4* | 0.7 | 210 | 18–20 | 80 | Deposited on the back surface of the blade. A portion of the mixed product was discharged and fell from the periphery of the mixing zone. |
| 5* | 10 | 205 | 17–19 | 90 | A small amount of the mixed product fell from the periphery of the mixing zone. |
| 6* | 25 | 190 | 15–16 | 95 | Generally good. Close contact of the blade with the periphery of the discs was required. |

*Comparative Test

Example 2

Example 1 inclusive of comparative tests was repeated in the same manner as described except that calcium carbonate powder was mixed with the polypropylene pellets with a by weight ratio of the polypropylene to the calcium carbonate of 37:63. The results are summarized in Table 2.

As will be appreciated from the results shown in Table 2, the recovery rate of the mixed product with the use of the mixing device according to the present invention is 100% even when calcium carbonate is blended with the polypropylene. With the use of the blade alone as in the comparative tests, the recovery rate becomes lowered especially when the MI of the polypropylene to be treated is small or when the rate at which the mixed product is discharged is increased. The mixed product discharged from the periphery of the mixing zone may be received in a slanted recovery vessel provided beneath the periphery of the mixing zone and may be displaced to a discharge port for recovery by application of vibration to the vessel. However, it becomes difficult to perform such recovery when the amount of the mixed product collected in the vessel becomes large.

The amount of the mixed product which falls from the periphery of the C-shaped ring 40 into the recovery vessel 26 is substantially zero with the mixing device of this invention. However, a small amount of the mixed product leaked from the gap between the discs and the ring 40 when the discharge rate is highly increased or the material to be treated has an extremely high or small MI. Such leaked product which falls into the recovery vessel 26 can be recovered without difficulty. The provision of the collecting ring 40 has an additional merit in that the mixed product is further mixed during its passage through the groove 42 of the ring 40.

TABLE 2

| Test No. | MI of polypropylene | Temperature of mixed product (°C.) | Load of motor (A) | Discharge rate (Kg/H) | Recovery rate (%) | Conditions |
|---|---|---|---|---|---|---|
| 7 | 0.7 | 225 | 28–31 | 68 | 100 | Mainly scraped by the blade 44 |
| 8 | 10 | 205 | 23–25 | 68 | 100 | Mainly fell from the open end 43 |
| 9 | 25 | 210 | 24–25 | 68 | 100 | Mainly fell from the open end 43 |
| 10* | 0.7 | 215 | 24–26 | 68 | 60 | Fell from the periphery of the mixing zone |
| 11* | 10 | 200 | 23–25 | 68 | 95 | Mainly scraped by the blade |
| 12* | 10 | 200 | 36–38 | 110 | 50 | Fell from the periphery of the mixing zone |
| 13* | 25 | 210 | 19–21 | 68 | 100 | Entirely scraped by the blade |
| 14* | 25 | 220 | 25–27 | 110 | 80 | Fell from the periphery of the mixing zone |

*Comparative Test

TABLE 3

| Ratio of CaCO₃ to PP (wt/wt) | Kneading capacity (Kg/H) | Temperature of product (°C.) | Load of motor (A) |
|---|---|---|---|
| 1 | 80 | 185 | 24 |
| 2 | 87 | 200 | 24 |
| 3 | 80 | 205 | 24 |
| 4 | 75 | 220 | 28 |

The feed stock in the present example is of a type which is very difficult to knead. Further, the resulting product is sticky and is difficult to recover. However, the mixing device of this invention is able to treat such a feed stock satisfactorily. As shown in Table 3, a feed stock with a ratio of the calcium carbonate to the polypropylene of 4:1 can be kneaded with only a slight increase of the temperature of the product and the load of the motor.

Example 4

Using the same mixing device of the present invention as used in Example 1, various feed stocks as shown in Table 4 were kneaded under the conditions shown in Table 4. The rotational speed of the lower disc was 23 r.p.m.

Example 3

Regenerated polypropylene pellets (MI: 8) and calcium carbonate were kneaded using the same mixing device of the present invention as used in Example 1. The heating temperature was adjusted at 240° C. The results were as shown in Table 3.

TABLE 4

| Test No. | Plastic material (pellet) | Filler (powder) | Filler to plastic mixing ratio | Load of motor (A) | Heating temp. of heater (°C.) | Temp. of product (°C.) | Kneading capacity (Kg/H) | Recovery state | State of kneaded product |
|---|---|---|---|---|---|---|---|---|---|
| 15 | 6-Nylon | — | — | 33 | 270 | 230 | 56 | Good | Good |
| 16 | 6-Nylon | CaCO₃ | 1 | 35 | 300 | 280 | 51 | Good | Good |
| 17 | 6,6-Nylon | — | — | 21 | 300 | 265 | 25 | Good | Good |
| 18 | 6,6-Nylon | CaCO₃ | 0.5 | 25 | 300 | 270 | 37 | Good | Good |
| 19 | Regenerated polyethylene | Iron oxide | 5 | 25 | 240 | 215 | 90 | Good | Good |
| 20 | Ground polyvinyl chloride | — | — | 26 | 200 | 205 | 56 | Good | Good |
| 21 | Ground polyvinyl chloride | CaCO₃ | 1 | 28 | 200 | 225 | 65 | Good | Good |

As shown in Table 4, high melting point 6-Nylon (mp: 225° C.) and 66-Nylon (mp: 265° C.) may be effectively kneaded and recovered irrespective of whether or not a filler is present. It is advisable to mount a suitable heater on the collecting ring so as to prevent the mixed product flowing through the passage thereof from solidifying, when the material to be treated has a high melting point. As seen from the results of test No. 19, the use of iron oxide in an amount of 5 times that of the regenerated polypropylene still permits both the effective mixing and the recovery of the mixed product. The results of test Nos. 20 and 21 show that the polyvinyl chloride which is thermally unstable may be effectively kneaded and recovered with the use of the mixing device of this invention. This is attributable to the high mixing efficiency of the mixing device, which makes it possible to reduce the mixing time to, for example, 10 to 15 sec. No problems arise from the use of a filler.

Example 5

Polyethylene powder and wood powder (80 mesh) were continuously kneaded using the device used in Test No. 1 of Example 1 with rotational speeds of the disc 10 in the range of 15 to 40 r.p.m. (Test No. 22). Very well kneaded products in the form of a melt were obtained in the kneading time of 5 to 30 seconds. For the purpose of comparison, similar tests (Tests Nos. 23–27) were performed using known kneading machines. The results were as shown in Table 5. In test No. 23, the carbonization and decomposition of the wood powder were found to occur. With the mixer used in Test No. 24, it was impossible to optionally select the mixing ratio of the filler to the plastic. With the mill used in Tests Nos. 25 and 27, kneading of a plastic in the form of a pellet required a high load. In Test No. 26, there was observed slight carbonization of the wood powder.

TABLE 5

| Test No. | Kneading Device | Operation | Rotation speed (r.p.m.) | Kneading time | State of kneaded product* |
|---|---|---|---|---|---|
| 22 | Present invention | Continuous | 15–40 | 5–30 sec. | A |
| 23** | Kneader | Batch | 34–60 | 30–60 min. | D |
| 24** | Henschel mixer | Batch | 700–2800 | 10–40 min. | C |
| 25** | Unidirectional, biaxial rotary mill | Continuous | about 150 | 2–5 min. | B |
| 26** | Hetero-directional, biaxial rotary mill | Continuous | 300–500 | 2–5 min. | C |
| 27** | Hetero-directional, biaxial rotary mill with vacuum bent | Continuous | 16–50 | 4–10 min. | B |

*Evaluation was rated as follows
A: Excellent
B: good
C: bad
D: very bad
**Comparative Example

We claim:

1. A mixing device comprising:
    a pair of plate means coaxially aligned and spaced apart from each other, each plate means having an operating surface positioned parallel to and facing the other operating surface to define therebetween a mixing zone and being adapted so that, by rotation of one of the plate means, a relative motion between the two operating surfaces may be maintained;
    grooves provided in both of said operating surfaces and arranged so that the grooves of one operating surface may cross the grooves of the other operating surface upon the relative motion between the two operating surfaces; and
    a collecting ring provided around the periphery of said mixing zone, said ring having a groove extending around an inner surface thereof to define an annular passage between the collecting ring and the plate means, said passage being open at its downstream end with respect to the direction of the rotation of the plate means and being closed at it upstream end, so that the mixed product discharged from said mixing zone is collected within said passage, displaced therethrough in the direction of the rotation of the plate means upon rotation of the plate means and discharged from the downstream end of said passage.

2. A mixing device as claimed in claim 1, wherein said groove of the collecting ring is shaped so that said passage has a sectional area gradually reduced from the downstream end toward the upstream end.

3. A mixing device as claimed in claim 1, wherein the grooves on the operating surface of each of said plate means includes a plurality of angularly equally spaced grooves radially extending on the operating surface to divide said surface into a plurality of sectors, and a plurality of grooves arranged in each sector parallel with the radial groove of each sector.

4. A mixing device as claimed in claim 1, wherein one of said plates is mounted on a support plate on which a heating means is mounted so that the feed materials in said mixing zone may be heated to a desired temperature.

5. A mixing device as claimed in claim 1, further comprising an annular recovery vessel disposed adjacent to the periphery of said mixing zone.

6. A mixing device as claimed in claim 3, wherein said plate means comprises an assembly of segments corresponding to said respective sectors.

7. A mixing device as claimed in claim 1, further comprising one or more inlet ports in one of the plate means for introducing the feed materials to be mixed into said mixing zone.

8. A mixing device as claimed in claim 1, wherein said plate means are in a circular form.

* * * * *